Oct. 13, 1959          H. AMOS          2,908,039
APPARATUS FOR PRODUCING OBJECTS OF CURED PLASTIC MATERIAL
Filed July 25, 1956          2 Sheets-Sheet 1
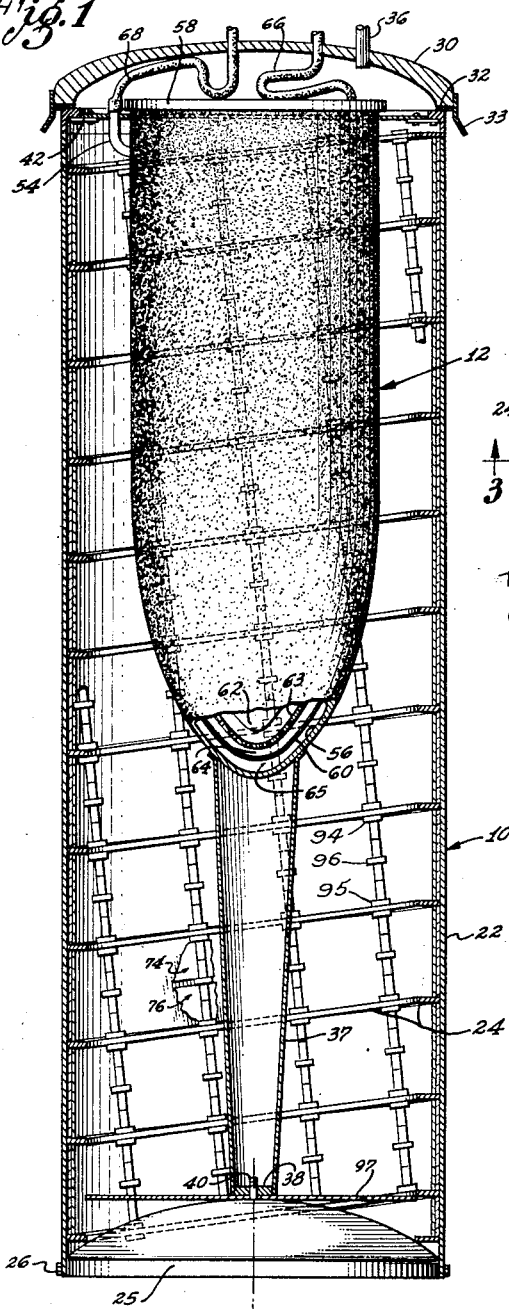
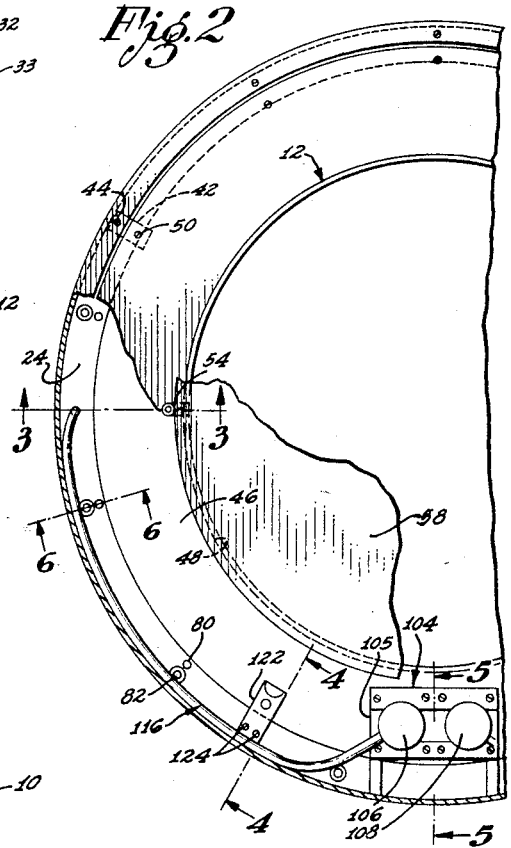
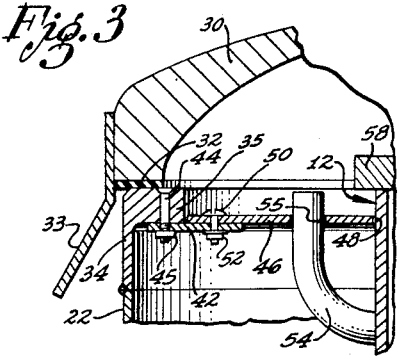
INVENTOR.
Homer Amos
BY
Attorneys.

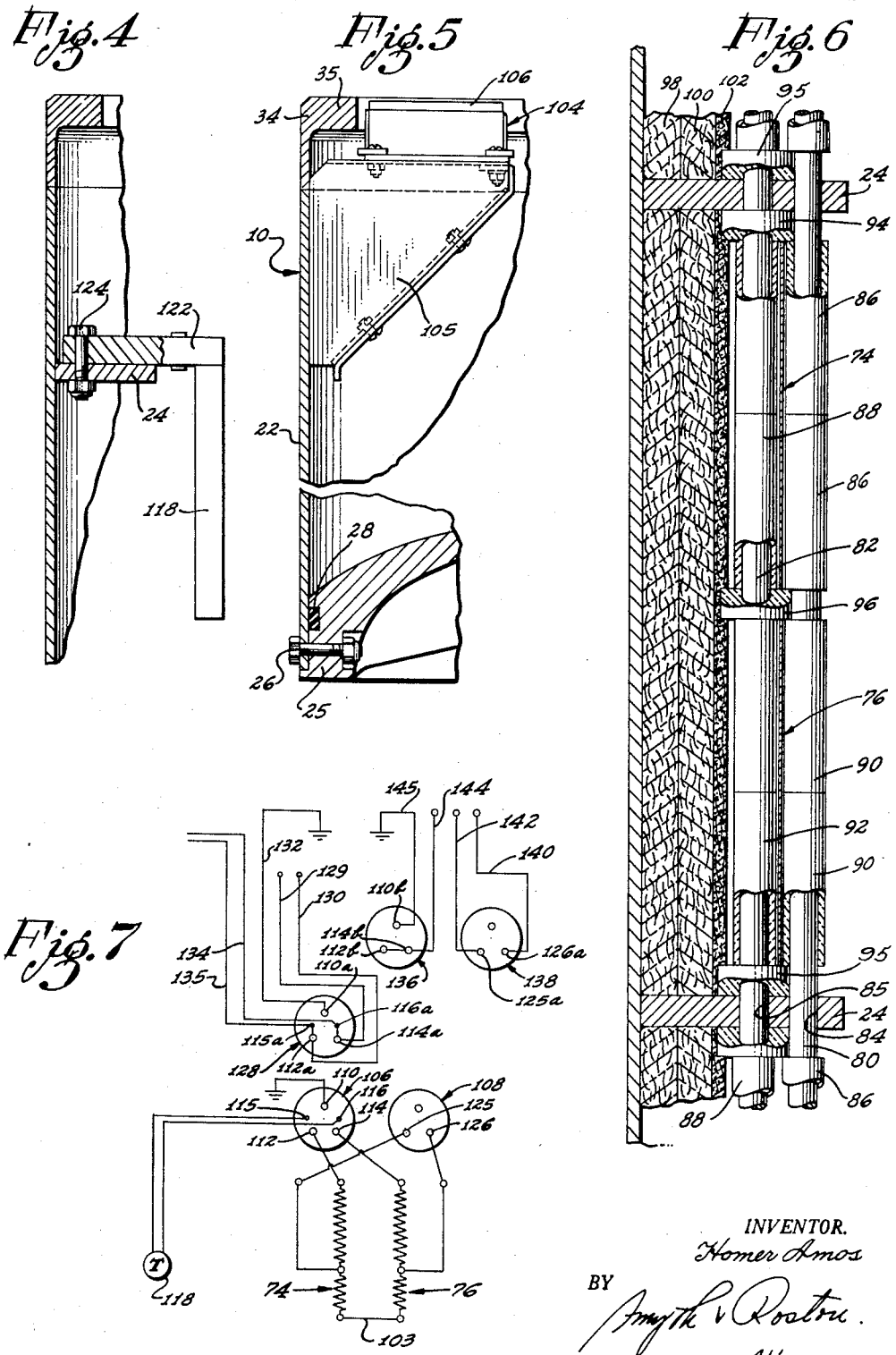

United States Patent Office 2,908,039
Patented Oct. 13, 1959

2,908,039
APPARATUS FOR PRODUCING OBJECTS OF CURED PLASTIC MATERIAL

Homer Amos, Burton, Wash., assignor to Pastushin Aviation Corporation, Los Angeles, Calif., a corporation Application July 25, 1956, Serial No. 600,096

7 Claims. (Cl. 18—26)

This invention relates to an apparatus for producing a hollow molded object of plastic material.

The invention is based on production procedures disclosed in the co-pending Amos et al. application, Serial No. 448,064, filed August 5, 1954, entitled Method and Apparatus for Fabricating Hollow Bodies and Sheets of Plastic Material, and disclosed in the co-pending Amos application, Serial No. 576,177, filed April 4, 1956, entitled, Means and Apparatus for Molding and Curing Plastic Material, both of which disclosures are hereby incorporated into the present disclosure by reference.

The apparatus of the present invention includes a hollow mold to receive a layer of the uncured plastic material on the inner surface thereof and includes what may be termed a shroud to enclose and support the mold. The mold is evacuated for the purpose of vacuum-processing the layer of uncured plastic material and the shroud may also be evacuated thereby to serve as a bell jar for the mold to prevent placing the mold under substantial pressure. A further purpose of the shroud is to provide means to heat the mold at a relatively low rate for the purpose of curing the plastic layer and, subsequently, to heat the mold at a relatively high rate to expand the mold for freeing the cured plastic therefrom.

The problems to which the present invention is directed relate to the role of the shroud in heating the enclosed mold. In the first mentioned prior disclosure, heat is introduced into the shroud from an outside source at a relatively low rate to cure the layer of plastic in the enclosed mold and subsequently the shroud is moved to a different location to receive heat at a higher rate from a second outside source to expand the mold rapidly for the purpose of freeing the cured layer from the mold.

The present invention provides electrically energized radiant heating means inside the shroud itself for heating the enclosed mold and thereby makes the shroud completely independent of any outside heating means. The radiant heating means may be energized selectively at either a relatively low rate of energy input for the curing step or at a relatively high rate of energy input for loosening the cured layer.

In the preferred practice of the invention, the shroud is internally reinforced by circumferential rib means to withstand a relatively high inward pressure differential when the shroud is evacuated and the radiant heating means is mounted on the rib means. In this regard, a feature of the preferred practice of the invention is the use of a helical reinforcement rib and helically arranged radiant heating means conforming to the configuration of the rib.

By way of example, the present disclosure relates to the production of elongated stream-lined tanks made of polyester resin reinforced by embedded glass fibers. Each tank is molded in two end sections that are subsequently bonded together to make a finished tank, the two end sections being of different tapered configurations. These tapered end sections may be made in a range of sizes varying both in diameter and in length. A feature of the invention is that the production of such diverse tank sections is simplified and reduced in cost by adapting a plurality of molds for use interchangeably in a single shroud.

It is highly desirable that the radiant heating means in the shroud heat the mold in a substantially uniform manner. A certain problem arises in the use of radiant heating means for this purpose, since the amount of heat applied to a given area of the mold depends not only on the distance of that area from the radiant source but also on the ratio between that area and the total area of the heating surface directing heat thereto. Thus, if a cylindrical shroud of uniform diameter is used with a mold of tapering configuration, a relatively small area of the tapered portion of the mold is exposed to a relatively large area of the radiant heat source. If the mold is substantially shorter than the shroud with the tapered end of the mold at an intermediate point in the length of the shroud, the total area of the heating source affecting the tapered end of the mold is even greater.

The invention solves this problem by varying the surface finish of the mold to vary the heat-absorption efficiency of the various areas of the mold inversely as the rate of radiant heat application thereto. Thus, a mold area receiving a minimum amount of radiant heat may be painted black for maximum heat absorption and, on the other hand, a mold area receiving an excessive amount of radiant heat may be of a bright polished finish for maximum heat reflection and minimum heat absorption. This method of compensating for differences in rate of heat radiation to the various areas of a mold make it possible to use molds of various shapes and dimensions interchangeably in a single shroud with all of the molds heated uniformly.

The above features and advantages of the invention, together with other features and advantages, may be understood by reference to the following detailed description considered with the accompanying drawings.

In the drawings, which are to be regarded as merely illustrative:

Figure 1 is a longitudinal sectional view of a shroud and an enclosed mold embodying a selected practice of the invention;

Figure 2 is a fragmentary plan view of the shroud and mold on an enlarged scale with the shroud cover removed, a rim portion of the structure being broken away:

Figure 3 is a greatly enlarged fragmentary section taken as indicated by the line 3—3 of Figure 2 showing how support means at the upper end of the shroud releasably engages a mold;

Figure 4 is a greatly enlarged fragmentary sectional view taken as indicated by the line 4—4 of Figure 2 showing how a thermostat may be installed in the mold;

Figure 5 is a greatly enlarged fragmentary section taken as indicated by the line 5—5 of Figure 2 showing details of the shroud structure;

Figure 6 is an enlarged fragmentary section taken as indicated by the line 6—6 of Figure 2, showing how the radiant heating means is mounted inside the peripheral wall of the shroud; and Figure 7 is a wiring diagram showing an electrical arrangement for energizing the radiant heating means selectively at a relatively low rate of heat input for curing the plastic material and a relatively high rate of heat input to expand the mold for the purpose of dislodging the cured plastic therefrom.

In the particular embodiment of the invention selected for the present disclosure, an upright shroud generally designated by numeral 10 is adapted to support and enclose a mold, generally designated by the numeral 12. Preferably, the shroud 10 is adapted to be rotated about its longitudinal axis for the purpose of rotating the enclosed mold 12, whereby plastic material and reinforcement material may be deposited on the inner surface of the mold and may be held thereon by centrifugal force. For this purpose, a suitable motor 14 actuates a drive sheave 15 by means of gearing in a gear box 16. The drive sheave 15 is connected by a belt 18 with a driven sheave 20 that is operatively connected to the shroud 10. The shroud, together with the motor 14, may be mounted on either a conveyor or a turntable for movement from one processing station to another, as taught by the first mentioned co-pending patent application.

It is contemplated that the shroud 10 will be of a construction to withstand a vacuum therein. In the construction shown, the shroud 10 has a relatively heavy metal cylindrical wall 22, which wall may be suitably reinforced internally. In this instance, the cylindrical wall 22 is internally reinforced by a helical rib 24 of heavy metal bar stock.

The bottom of the shroud is closed by an inwardly dished head 25 which may be a metal casting shaped as best shown in Figure 5. This bottom head 25 is secured to the cylindrical wall 22 by suitable bolts 26 and has a circumferential groove to receive an O-ring 28 to make the bottom of the shroud airtight.

The upper end of the shroud 10 is provided with a conveniently removable closure in the form of a dished cover casting 30 which is provided with a sealing gasket 32 of rubber-like material to rest on the upper rim of the shroud.

The cover casting 30 may be provided with a plurality of outwardly inclined guide tabs 33 to cooperate with the shroud rim when the cover casting is lowered into position. For cooperation with the sealing gasket 32, a suitable rim member 34 is welded to the upper end of the cylindrical wall 22 in a fluid-tight manner, this rim member forming a heavy inwardly turned rim flange 35. As best shown in Figure 3, the sealing gasket 32 rests flat on the rim flange 35 and, of course, is subject to sealing pressure whenever the creation of a vacuum inside the shroud places the cover casting under a pressure differential. A suitable flexible hose 36 connects the cover casting 30 to a vacuum pump (not shown) for evacuation of the interior of the shroud when desired.

The particular mold 12 shown in Figure 1 is employed to fabricate one of the two end sections of a jettisonable auxiliary fuel tank for an airplane and therefore has a rounded tapered inner end as shown. In this instance, the mold is substantially shorter than the shroud and is supported in the shroud with the upper end of the mold substantially at the level of the shroud rim.

It is contemplated that the mold 12 will be mounted in the shroud 10 in a conveniently removable manner so that a number of molds of different dimensions and configurations may be used interchangeably in the one shroud. In the construction shown, a tapered longitudinal support 37 of sheet metal construction is fixedly attached to the tapered end of the mold 12 to constitute, in effect, a longitudinal extension of the mold. The lower end of the longitudinal support 37 is provided with a small ring 38 to releasably engage a centering stud 40 that is mounted in the bottom head 25. It is apparent that any number of molds of different length may be used interchangeably, the various molds being provided with longitudinal supports 37 of compensating lengths.

The upper end of the mold 12 is centered and supported against lateral forces by additional support means, the construction of which is shown in Figures 1, 2 and 3. A plurality of spaced short metal bars or tabs 42 are fixedly mounted to the underside of the rim flange 35 by suitable screws 44 and cooperating nuts 45. Superimposed on the inner ends of the tabs 42 is what may be termed a centering plate 46 that has a large circular aperture 48 to embrace and center the upper end of the mold 12. The centering plate 46 is releasably anchored to the tabs 42 by suitable screws 50 that engage anchor nuts 52, the anchor nuts being fixedly mounted on the underside of the tabs. To keep the mold 12 from rotating relative to the shroud 10 when the shroud is rotated by the motor 14, a curved nipple 54 mounted on the outside of the mold near the upper end of the mold extends into a corresponding eccentrically positioned aperture 55 in the centering plate 46. As will be explained, the primary purpose of nipple 54 is to serve as an evacuation means.

The mold 12 may be constructed as taught in the two above mentioned co-pending patent applications. When the mold 12 is rotated by the shroud 10 to carry out the operation of depositing a layer 56 of uncured plastic material on the inner surface thereof, the upper end of the mold is open to permit the introduction of the plastic material as well as reinforcement material to be embedded therein. Subsequently, however, the rotation is stopped and the upper open end of the mold 12 is closed and sealed by a closure assembly that is inside the cover casting 30 and is generally designated by numeral 58.

In the usual manner, the closure assembly 58 supports a bag 60 of flexible impervious material inside the mold 12 and further supports a suitable body inside the bag to serve as a mandrel for the bag and to reduce the volume of air space in the bag. This particular mandrel, which conforms to the configuration of the mold has an inner solid wall 62 to provide the air displacement and has an outer perforated wall 63 for contact with the bag 60. The bag 60 is connected to the sealed closure assembly 58 in a fluid-tight manner and thus divides the interior of the mold 12 into an inner chamber 64 inside the bag and a surrounding outer space 65. The inner chamber 64 contains the mandrel and the surrounding outer space 65 contains the layer 56 of the uncured resin.

A flexible hose 66 extends through both the cover casting 30 and the closure assembly 58 in a fluid-tight manner and is connected to a vacuum pump (not shown) to evacuate the inner chamber 64. For evacuation of the outer surrounding space 65, a second flexible hose 68 is connected to the nipple 54 in the manner shown in Figure 1. Evacuation of the shroud 10 is accomplished by means of the hose 36 as heretofore stated.

In the preferred practice of the invention, the radiant heating means for heating the mold 12 and thereby heating the resin layer 56 comprises a pair of electrical heating elements in the form of two ribbons 74 and 76, which are positioned side by side and are arranged spirally inside the cylindrical wall 22. Each of these ribbons 74 and 76 may be, for example, .0071 inch thick and $3^{13}/_{16}$ wide. Any suitable arrangement may be used to support the two ribbons 74 and 76 in an insulating manner in the desired helical configuration.

In the present embodiment of the invention, several pairs of rods each comprising an inner rod 80 and an outer rod 82, are spaced circumferentially around the interior of the shroud 10. The various turns of the helical rib 24 have apertures 84 (Figure 6) to receive the inner rod 80 and apertures 85 to receive the outer rod 82. The pairs of rods 80 and 82 are substantially perpendicular to the turns of the helical rib 24 and therefore are inclined from the vertical in accord with the pitch of the rib as may be seen in Figure 1. The heating element ribbon 74 is confined between pairs of ceramic tubes 86 and 88 on the pairs of rods 80 and 82, respectively, and, in like manner, the second heating element ribbon 76 is confined between pairs of ceramic tubes 90 and 92 which are also mounted on the pairs of rods 80 and 82, respectively.

As best shown in Figure 6, a ceramic spacer collar 94 is mounted on each of the rods 82 on the underside of each turn of the helical rib 24 in abutment with the upper end of each pair of ceramic tubes 86 and 88, and a ceramic spacer collar 95 is also mounted on each rod 82 on the upper side of each turn of the helical rib 24 in abutment with the lower ends of the ceramic tubes 90 and 92. Each pair of ceramic tubes 86 and 88 is separated from the corresponding pair of ceramic tubes 90 and 92 by a third ceramic collar 96 on the corresponding rod 82. Thus, the heating element ribbon 74 is supported and confined at spaced circumferential points by pairs of ceramic tubes 86 and 88 in cooperation with corresponding pairs of ceramic collars 94 and 96, and, in like manner, the second heating element ribbon 76 is supported and confined at circumferentially spaced points by pairs of ceramic tubes 90 and 92 in cooperation with corresponding pairs of ceramic collars 95 and 96.

For greater effectiveness of the radiant heat from the heating elements, suitable reflecting means may be provided. Thus Figure 1 shows a bright polished reflector disc 97 fixedly mounted on the bottom head 25, with the centering stud 40 extending through the disc.

Preferably, the shroud 10 is suitably lined with heat-insulating material to reduce heat losses to the atmosphere. For this purpose, the cylindrical wall 22 of the shroud may be lined with two soft fluffy layers 98 and 100 of glass fibers and a third inner layer 102 of glass felt. The insulating material of these three layers may be of conventional heat-resistant glass, the third inner layer being capable of withstanding a temperature of 1400° F. If desired, quartz glass may be substituted to withstand temperatures up to 3200° F. As shown in the drawings, each of the three layers 98, 100 and 102 may be in the form of a strip dimensioned in width to fit between two successive turns of the rib 24, each strip being of helical configuration to conform to the helical configuration of the rib.

The heating element ribbons 74 and 76 may be adapted in any suitable manner for energization by a voltage source. The electrical arrangement that is used for this purpose in the present embodiment of the invention provides for energizing the two heating element ribbons 74 and 76 in series with a source of single phase 230 volt alternating current for the curing operation or for energizing the two heating element ribbons by a source of three phase 230 volt alternating current in a delta hook-up to provide the "flash" heat for separating the mold from the cured plastic layer. For this purpose, the lower end of the two heating element ribbons 74 and 76 are electrically interconnected as indicated at 103 and the upper ends are connected to what may be termed a terminal assembly 104 (Figures 2 and 5). The terminal assembly 104 is mounted inside the top end of the shroud 10 by a suitable bracket 105. This terminal assembly includes two electrical receptacles 106 and 108 for mating with plug fittings by means of which the heating element ribbons 74 and 76 may be connected to a suitable voltage source and also may be connected to a suitable switch panel (not shown).

The terminal assembly 104 includes a receptacle 106 adapted to mate with plug fittings. The receptacle 106 has a grounded contact 110, a contact 112 that is connected to the upper end of the heating element ribbon 74, and a contact 114 that is connected to the upper end of the heating element ribbon 76. The receptacle 106 has two additional contacts 115 and 116 that are connected to a thermostat element 118 which is preferably in the form of a thermister.

The thermister 118 may be mounted inside the shroud at a suitable location to respond to changes in temperature therein. In the present construction, as shown in Figure 4, the thermister 118 depends from an arm 122 and the arm 122 is mounted on a turn of the helical rib 24 by bolt means 124.

The second receptacle 108 that is adapted to mate with plug fittings has a contact 125 that is connected to an intermediate tap of the heating element ribbon 74, and has a second contact 126 that is connected in the same manner to an intermediate tap of the heating element ribbon 76.

To energize the two heating element ribbons 74 and 76 for a period of time to cure the layer of resin 56 in the mold 12, a plug 128 is inserted into the receptacle 106 to connect the two heating element ribbons 74 and 76 in series with a suitable source of single phase 230 volt alternating current. The plug 128 has five contacts, 110a, 112a, 114a, 115a and 116a, which correspond with and mate with the contacts of the same numerals in the receptacle 106. These five contacts are connected to corresponding conductors in a cable that leads to a switchboard for connection to a source of 230 volt single phase alternating current. A pair of conductors 129 and 130 of the cable connect the contacts 112a and 114a with the voltage source and a third conductor 132 grounds the contact 110a. A pair of conductors 134 and 135 of the cable connect the contacts 115a and 116a to suitable means for controlling the current in accord with the temperature prevailing in the shroud, the two contacts 115a and 116a being connected respectively to the contacts 112a and 114a as shown.

For the purpose of energizing the heating element ribbon 74 and 76 at a substantial higher rate of heat input to expand the mold 12 faster than the cured resin layer 56 thereby to break the bond between the mold and the cured resin, a plug 136 is mated with the receptacle 106 and a plug 138 is mated with the receptacle 108. These two plugs are carried by a cable having four conductors, the cable being employed to connect the heating resistance ribbons 74 and 76 to a suitable switchboard for connection thereby to a suitable source of three phase 230 volt alternating current. One cable conductor 140 is connected to a contact 126a that mates with the contact 126 of the receptacle 108 and a second conductor 142 of the cable is connected to a contact 125a that mates with the contact 125 of the receptacle 108. A third conductor 144 of the cable is connected to both contacts 112b and 114b of the plug 136, these two contacts mating with the contacts 114 and 112 of the receptacle 106. The fourth conductor 145 of the cable is connected to a contact 110b of the plug 136, which contact mates with contact 110 of the receptacle 106. Thus, the two plugs 136 and 138 cooperate with the two receptacles 106 and 108 to provide a delta hook-up for the two heating element ribbons 74 and 76.

The manner in which the described apparatus serves its purpose may be readily understood from the foregoing description. To fabricate an end section of a jettisonable fuel tank, the shroud is rotated to rotate the mold. While the mold is rotating, the polyester resin and the glass fiber reinforcement material are deposited on the inner surface of the mold to form the layer 56. When the depositing step is completed, the rotation of the shroud is stopped. The plug 128 is then inserted into the receptacle 106 in preparation for a later curing operation and then the cover casting 30 is seated on the stationary shroud and then the various hose connections are completed as shown in Figure 1.

By means of the hose 36, the interior of the stationary shroud 10 is evacuated and by means of the hose 68 the outer space 65 of the mold is evacuated, the evacuation of the space 65 serving to withdraw air and moisture from the layer 56 of uncured resin. At the same time, the inner chamber 64 is evacuated by means of the hose 66 to keep the bag 60 from interfering with the withdrawal of the air and moisture from the uncured resin. Preferably, the inner chamber 64 is evacuated to a greater degree than the surrounding outer space 65 to create an inward pressure differential of slight magnitude across the wall of the bag 60 to pull the bag away from the layer 56 of uncured plastic, the bag being drawn against the perforated wall 63 of the mandrel.

The fact that the shroud and the mold are evacuated simultaneously, makes it possible to use a mold 12 having a relatively thin wall.

After a time interval to permit air and moisture to be withdrawn from the layer 56 of uncured resin, the inner chamber 64 of the mold is placed in communication with the atmosphere by means of the hose 66 to raise the interior of the bag 60 to atmospheric pressure while the outer space 65 continues to be evacuated. The consequent outward pressure differential across the wall of the bag 60 presses the bag outward against the layer 56 of uncured plastic to place the layer under substantial pressure for a cure period. To carry out the cure, single phase current is supplied to the two heating element ribbons 74 and 76 by the plug 128 in the electrical receptacle 106 which places the heating element ribbons in series with the single phase 230 voltage source.

After this curing operation, air is admitted through the hose 36 to the interior of the shroud, through the hose 68 into the outer space 65 and through the hose 66 into the inner chamber 64. Then the inner chamber 64 of the mold is partially evacuated through the hose 66 thereby to create an inward pressure differential of relatively high magnitude across the wall of the bag. This inward pressure differential causes the bag 60 to peel away from the cured plastic layer, the bag being collapsed against the perforated wall 63 of the mandrel. The cover casting 30 is then removed from the mold and the closure assembly 58 together with the bag 60 and the mandrel is removed from the mold 12. During this removal operation, the evacuation of the inner chamber 64 may be continued to keep the bag collapsed against the mandrel thereby to lessen the danger of accidental damage to the bag.

Finally, with both the cured plastic layer and the mold at a relatively low temperature the plug 136 is inserted into the receptacle 106 and the plug 138 is inserted into the electrical receptacle 108 to raise the temperature of the mold more rapidly than the temperature of the cured resin layer thereby to cause the mold to expand and separate from the cured resin.

My description in specific detail of the presently preferred practice of the invention will suggest various changes, substitutions and other departures from my disclosure that properly lie within the spirit and scope of the appended claims.

I claim:

1. In an apparatus for forming hollow objects of plastic material, the combination of: a hollow mold for the deposit of a layer of uncured plastic material on the inner surface thereof; a shroud enclosing said mold and forming therewith a space surrounding the mold; radiant heating means in said surrounding space to heat the mold by radiation for curing said layer; means to energize said radiant heating means at a relatively low rate of energy input to cure said layer; and means to energize said radiant heating means at a relatively high rate of energy input for rapid thermal expansion of the mold to separate the cured layer therefrom.

2. In an apparatus for forming hollow objects of plastic material, the combination of: An upright shroud; a hollow mold in said shroud of less length than the shroud, said mold being tapered and the finish of the surface of the mold varying progressively from a substantially nonreflective finish to a highly reflective finish in accord with said taper; support means rigidly connected to the inner end of the said mold and extending therefrom to the bottom of the shroud in releasable engagement with said bottom to support the mold in position at the upper end of the shroud; means at the upper end of said shroud to releasably hold the upper end of the mold centralized in the shroud, whereby a number of molds of different lengths may be mounted interchangeably in the shroud; and radiant heating means inside the peripheral wall of said shroud surrounding said mold to heat the mold by radiation for curing said layer.

3. An apparatus as set forth in claim 2 which includes an upwardly facing reflector in the bottom of the shroud to reflect the radiant upward towards the bottom of the mold.

4. In an apparatus for forming hollow objects of plastic material, the combination of: a shroud having a peripheral wall; a hollow mold for the deposit of an uncured layer of said material on the inner surface thereof; radiant heating means inside said peripheral wall and surrounding said mold to heat the mold by radiation thereby to cure said layer, the ratio between the area of said mold and the area of said heating means directing radiation thereto being different at different zones of the mold whereby the rate of heat application to the mold varies among said zones, the surface finish of said mold varying in reflectivity of radiant heat inversely with respect to said ratios to cause substantially uniform heating of the mold.

5. An apparatus as set forth in claim 4 in which the surface of said mold has a black finish in the zones of minimum ratio and in which the surface of said mold is bright and polished in the zones of maximum ratio.

6. An apparatus as set forth in claim 4 in which said shroud is of substantially uniform configuration and said mold is of tapering configuration at one end; and in which the finish of the surface of said mold varies progressively from a substantially nonreflective finish to a highly polished bright finish in accord with said taper.

7. In an apparatus for forming hollow objects of plastic material, the combination of: a hollow mold for the deposit of a layer of uncured plastic material on the inner surface thereof; a cylindrical shroud enclosing said mold and forming therewith a space surrounding the mold; means to seal off said mold and shroud from the atmosphere whereby the shroud and mold may both be evacuated simultaneously to withdraw air and moisture from the layer of uncured plastic material without creating a pressure differential across the wall of the hollow mold; rib means extending around the inner circumference of said shroud and extending inwardly from the inner surface thereof to reinforce the shroud against inward collapse when the shroud is evacuated, said rib means having a plurality of turns spaced apart longitudinally of the shroud; electrical radiant heating means extending around the inner circumference of said shroud between the turns of said rib means to heat the outer surface of said hollow mold by radiant heat; and means connected with said rib means to support said heating means; said cylindrical shroud having a closed inner end and said mold having a closed inner end spaced therefrom; and which includes reflector means inside said shroud at the closed end thereof to reflect the radiant heat towards the closed end of the mold.

References Cited in the file of this patent

UNITED STATES PATENTS

| | | |
|---|---|---|
| 1,023,764 | Senac | Apr. 16, 1912 |
| 1,149,669 | Mauersberger | Aug. 10, 1915 |
| 1,390,005 | Young | Sept. 6, 1921 |
| 1,765,804 | Preston | June 24, 1930 |
| 2,035,092 | Nielson et al. | Mar. 24, 1936 |
| 2,103,951 | Lewis | Dec. 28, 1937 |
| 2,156,352 | Peterson | May 2, 1939 |
| 2,160,312 | Karthaus | May 30, 1939 |
| 2,165,671 | Ward | July 11, 1939 |
| 2,187,918 | Sloan | Jan. 23, 1940 |
| 2,257,366 | Bates et al. | Sept. 30, 1941 |
| 2,318,533 | Selvig | May 4, 1943 |
| 2,337,701 | Weinberg | Dec. 28, 1943 |
| 2,362,672 | Sloan | Nov. 14, 1944 |
| 2,363,107 | Young | Nov. 21, 1944 |
| 2,367,779 | Hull | Jan. 23, 1945 |
| 2,457,756 | Vest | Dec. 28, 1948 |
| 2,531,218 | Johnson | Nov. 21, 1950 |
| 2,810,931 | Wolf | Oct. 29, 1957 |

OTHER REFERENCES

Modern Plastics, August 1953, pp. 109, 110, 111, 114, 115. (Heating With Infra Red, by Frank Perrotta.)